United States Patent
Murray et al.

(10) Patent No.: US 6,675,135 B1
(45) Date of Patent: Jan. 6, 2004

(54) SIX SIGMA DESIGN METHOD

(75) Inventors: Jonathan A. Murray, Sussex, WI (US); Jeffrey R. Immelt, Pewaukee, WI (US); William A. Berezowitz, Greenfield, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/390,417

(22) Filed: Sep. 3, 1999

(51) Int. Cl.[7] ............... G06F 17/10; G06F 7/60; G06F 101/00
(52) U.S. Cl. ............... 703/2; 703/1; 700/95; 700/109; 702/179
(58) Field of Search ............... 703/1–2; 702/179–181; 700/95–97, 108–110

(56) References Cited

U.S. PATENT DOCUMENTS 6,253,115 B1 * 6/2001 Martin et al. ............ 700/97
6,301,516 B1 * 10/2001 Ostrowski et al. ........ 700/109
6,351,680 B1 * 2/2002 Ali et al. ............... 700/109
6,405,344 B1 * 6/2002 Ali et al. ............... 716/2
6,473,720 B1 * 10/2002 Hampson ............... 702/182

OTHER PUBLICATIONS

Harrold, "Designing for Six Sigma Capability", Control Engineering, vol. 46 Issue 1, pp. 62–64, 66, 68, and 70 (Jan. 1999).*

Smith, "Six–Sigma Design", IEEE Spectrum, vol. 30 Issue 9, pp. 43–47 (Sep. 1993).*

Lantzy, "Application of Statistical Process Control to the Software Process", ACM Proceedings of the 9th Washington Ada Symposium on Ada, pp. 113–123 (1992).*

* cited by examiner

Primary Examiner—Samuel Broda
(74) Attorney, Agent, or Firm—Quarles & Brady, LLP; Carl Horton (57) ABSTRACT

A method to be used during a product development procedure wherein the procedure includes a series of consecutive development phases and the product includes at least two critical to quality characteristics (CTQs). The method is for generating a confidence matrix which can be used to increase a product sigma through product design. A user initially provides product limits and thereafter provides additional development information during each consecutive development phase. During at least two of the development phases and for each CTQ, development information is used to determine a quality factor which is indicative of the probability that the product will be within the specified limits. Also, for each CTQ, a confidence factor is identified which is indicative of the probability that the quality factor is accurate. Then, quality factors, CTQs and confidence factors are arranged such that the CTQs and factors are correlated.

33 Claims, 4 Drawing Sheets

| REFERENCE SYSTEM | CTQS | PARAMETER | LOWER SPEC LIMIT | UPPER SPEC LIMIT | ALLOCATION MEAN | ALLOCATION STD DEV | PREDICTION MEAN | PREDICTION STD DEV | MEASURED (ACTUAL SAMPLE DATA) MEAN | MEASURED (ACTUAL SAMPLE DATA) STD DEV | ALLOC. $Z_{ST}$ | PREDICT $Z_{ST}$ | MEASURED $Z_{ST}$ | BASIS CF |
|---|---|---|---|---|---|---|---|---|---|---|---|---|---|---|
| STOCK | 1 | LENGTH | 2.95 | 3.05 | 3.0 | .01 | 3.1 | .015 | | | $Z_{a1}$ | $Z_{p1}$ | $Z_{m1}$ | 3 |
| | 2 | OUT-DIAM | .245 | .255 | .25 | .01 | .25 | .008 | | | $Z_{a2}$ | $Z_{p2}$ | $Z_{m2}$ | 2 |
| | 3 | IN-DIAM | ... | ... | ... | | | | | | $Z_{a3}$ | $Z_{p3}$ | $Z_{m3}$ | 1 |
| | 4 | COLOR | | | ... | | | | | | | | | 1 |
| | 5 | RIGIDITY | | | ... | | | | | | | | | 1 |
| CAP | 75 | LENGTH | | | | | | | | | | | | 1 |
| | 76 | OUT-DIAM | | | | | | | | | | | | 2 |
| | 77 | IN-DIAM | | | | | | | | | | | | 2 |
| | 78 | COLOR | | | | | | | | | | | | 1 |
| | 79 | RIGIDITY | | | | | | | | | | | | 3 |
| CLIP | 80 | LENGTH | | | | | | | | | | | | 1 |
| | 81 | ELASTICITY | | | | | | | | | | | | 1 |
| | 82 | WIDTH | | | | | | | | | | | | 2 |
| | 83 | SHEEN | | | | | | | | | | | | 1 |
| END CLOSURE | 84 | LENGTH | | | | | | | | | | | | 1 |
| | 85 | DIAMETER | | | | | | | | | | | | 1 |
| | 86 | COLOR | | | | | | | | | | | | 2 |
| | 87 | RIGIDITY | | | | | | | | | | | | 2 |
| | 88 | | | | | | | | | | $Z_{a88}$ | $Z_{p88}$ | $Z_{m88}$ | 2 |
| COMBINED Z | | | | | | | | | | | $Z_a$ | $Z_p$ | $Z_m$ | $CF_{OA}$ |
| | | | | | | | | | | | $Z_{OA}$ | | | |

SIX SIGMA DESIGN METHOD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a method for increasing the sigma of a process by identifying sigma during a product development procedure and providing a confidence factor for each sigma during the development procedure and, based on the confidence factor adjusting resource allocation in a proactive manner.

With the advent of a worldwide market place and corresponding consumer demand for highly reliable products, quality has become an increasingly important issue for manufacturers. When manufactured products having defects are produced and sold, the result is lost manufacturing time as well as unfavorable publicity for the manufacturer. The quality of a company's product line can therefore play a decisive role in determining the company's reputation. As a result of this pressure for defect free products, increased emphasis has been placed on quality control at virtually all levels of the manufacturing process. Higher quality requirements have lead to various initiatives designed to improve quality.

One way to track production quality is to plot a parameter (e.g. length) which measures a specific characteristic of a product being manufactured against frequency of production and by comparing the distribution (e.g., the range and frequency of lengths) to an optimum design point (e.g., a specified length) and upper and lower limits to identify defective products. The result is usually a Gausian distribution having a mean about the optimum parameter design point with some portion of production outside the limits.

The term "sigma" which is represented herein by the symbol Z is synonymous with a standard deviation. One measure of product quality is the number of sigmas or standard deviations about the distribution mean which fit within specified limits. For example, where one sigma (i.e. Z=1) fits within limits, 68% of an entire distribution is within limits. Where two sigmas (i.e. Z=2) fit within limits, 95% of the entire distribution is within the limits. Where six sigmas (i.e. Z=6) fit within limits, 99.9999998% of the total distribution is within the limits and only 3.4 parts per million (ppm) are outside the limits and defective. Thus, the higher the sigma value the better the output.

One general grouping of quality initiatives is referred to as "six sigma". Initially these initiatives were named six sigma because their goal was to achieve six sigma status or 3.4 ppm defects. More recently the term 41 six sigma" has been used to generally refer to any program having the goal of increasing a process Z (e.g., increasing Z from 4 to 5) or increasing quality.

While the name six sigma has only been coined relatively recently, the roots of the six sigma initiative (i.e., increasing Z) are in quantitative quality improvement efforts which were employed on manufacturing floors as early as the 1940s. In the factory environment it became common to "grow" or improve the quality of an existing product design by specifying product characteristics and limits, producing prototypes, measuring the characteristics of the prototypes and, where to many of the measured characteristics were not within the prescribed limits, adjusting some process step in an effort to conform a greater portion of the characteristics to the limits. In effect, iterative experiments were performed to increase Z.

While the Z of almost any process can be increased through extensive experimentation and adjustments, conventional methodologies for increasing Z have a number of shortcomings. First, because Z is related to actual product measureables, prototypes have to be produced prior to generating a process Z and process adjustments are only made after prototyping and measurement. In other words these conventional methodologies are reactive, not proactive, when it comes to identifying product characteristics which have to be modified. Prototype production and modification are relatively expensive and therefore prototyping increases development costs appreciably.

Second, in many cases a process includes several different variables which may affect a single characteristic of the end product. In these cases, which of a set of different variables will effect the characteristic positively (i.e, increase Z) often is unclear and therefore the process adjustment task to increase Z amounts to an unscientific guessing game. In effect, while a low Z indicates problems with a process, the low Z itself cannot provide a road map for increasing Z.

Third, even where prototypes are relatively inexpensive to produce, early on in the development and experimentation process only very few (or perhaps even zero) prototypes are produced. Where only a small number of prototypes are produced it is not possible to identify a process Z. Similarly, in the case of some highly specialized or extremely expensive products, only very few products may ever be produced. In these cases an accurate Z is never generated.

Fourth, reactive quality methodologies are extremely time consuming as prototyping, experimenting and adjusting have to be performed repeatedly in order to increase Z to an acceptable level. While the luxury of time may be available in some industries, increased speed to market is a competitive advantage in many different industries such that iterative design processes cannot be tolerated.

Therefore it would be advantageous to have a method for proactively predicting a sigma value during product development and also for identifying confidence identifying factors or data which can be used to assess the likelihood that the predicted sigma value is accurate so that development resources can be shifted during the development procedure to provide a process having a higher Z at the end of the procedure thereby reducing the need for reactive product and process redesign.

BRIEF SUMMARY OF THE INVENTION

An exemplary embodiment of the invention is directed to a method to be used during a product development procedure wherein the procedure includes a series of consecutive development phases and the product includes at least two critical to quality characteristics (CTQs). The method is for generating a confidence matrix which can be used to increase a product sigma through product design. A user initially provides product limits and thereafter provides additional development information during each consecutive development phase. During at least two of the development phases and for each CTQ, development information is used to determine a quality factor which is indicative of the probability that the product will be within the specified limits. Also, for each CTQ, a confidence factor is identified which is indicative of the probability that the quality factor is accurate. Then, quality factors, CTQs and confidence factors are arranged such that the CTQs and factors are correlated.

DETAILED DESCRIPTION OF THE INVENTION

Figure 1:
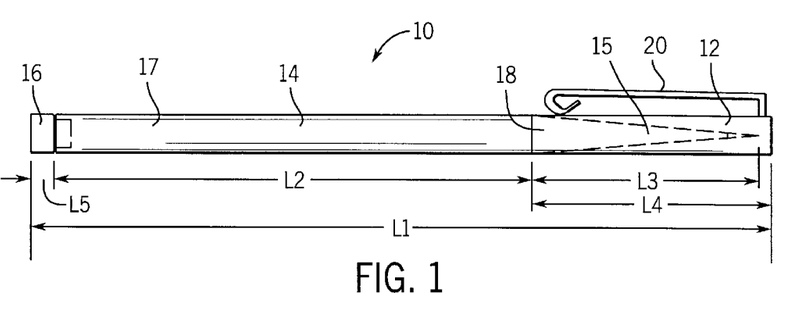
FIG. 1 is a schematic diagram of a pen.

While it is contemplated that the inventive method can be used during the design procedure for designing any product or process, referring to FIG. 1, in order to simplify this explanation, the invention will be described in the context of a simple design procedure for designing a pen housing 10 (i.e. the housing without the cartridge) including a cap 12, a barrel 14 and an end closure member 16. Cap 12 includes a cylindrical portion 18 and a clip 20. Barrel 14 includes a stock 17 and a tip 15 which is receivable within portion 18 for storage. With closure member 16 received within stock 17 and tip 15 in portion 18 the overall pen length L1 comprises member 16 length L5, stock 27 length L2 and cap length L4. In this example it will be assumed that there are certain critical-to-quality (CTQ) housing characteristics which have to be included in the final housing design. For example, the overall housing length L1 is critical, barrel diameter is critical, cap internal and external diameters are critical, the barrel length is critical and so on.

Theory

Every product development procedure follows a development time line from conception to production. For example, referring to FIG. 2, an exemplary time line 22 includes six phases including identify, specify, allocate, predict, measure and control phases 24, 26, 28, 30, 32 and 34, respectively. Line 22 also includes sub-phases 36 and 38 which correspond to analysis and improvement, respectively. During identify phase 24, a designer identifies CTQs of the product to be designed. In the pen example, as indicated above, the CTQs may include overall length, barrel diameter, barrel length and so on.

Figure 2:
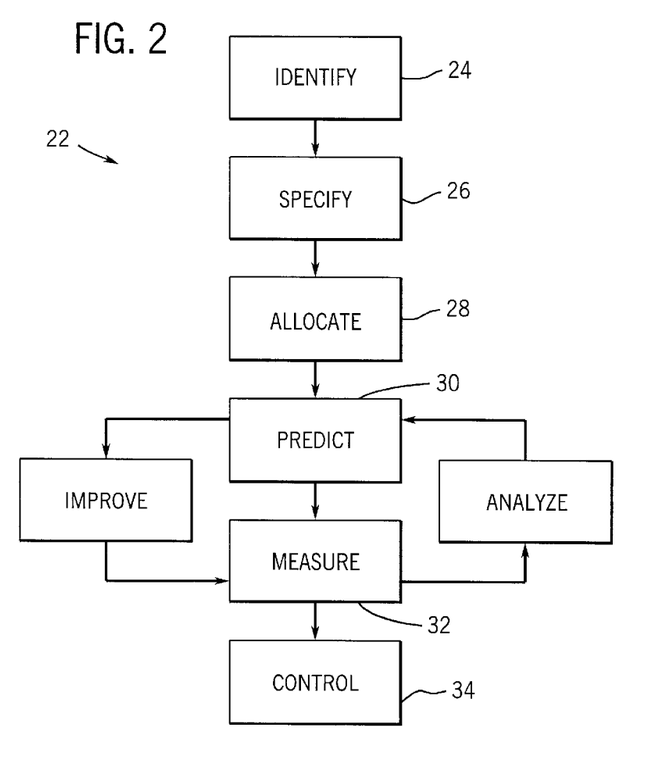
FIG. 2 is a block diagram of an exemplary development procedure.

After CTQs have been identified, during specify phase 26, the designer specifies upper and lower specification limits, USL and LSL, respectively, for each of the CTQs. For example, assuming a desired stock length is 3.0 inches, the lower limit may be 2.95 inches while the upper limit is 3.05 inches.

After the USLs and LSLs have been specified, during allocate phase 28, the designer allocates a mean and a standard deviation for each of the CTQs to specify the required quality for the particular CTQ. For example, a target mean for the stock length L2 in the present example may be 3.0 and the specified standard deviation may be 0.01.

During predict phase 30, the designer predicts the actual mean and standard deviation for each CTQ based on modeling, historical data and 11 expert opinion". For example, assuming the barrel will be formed of a specific plastic which has cooling characteristics after extrusion which vary depending on humidity, ambient temperature, etc. and which effect the final barrel length, assuming the cooling characteristics of the plastic can be mathematically modeled, a mean and a standard deviation can be predicted.

During measure phase 32, actual product prototypes are formed and the mean and standard deviations are measured for each CTQ. With respect to the pen barrel, several barrels are formed and CTQs are measured. After each CTQ is measured an overall product sigma can be determined which corresponds to the product.

After the product sigma is identified, the designer analyzes the sigma during analyze phase 36. Through analyses the designer identifies product and process modifications which, based on experience, will likely result in a better distribution. Then, at phase 30 again, the designer models the modified process and generates a new predicted mean and standard deviation for the improved process. Using the improved process the designer produces improved prototypes during phase 36, measures the CTQs during phase 32 and generates a new process sigma. This process of analysis, tweaking, improving, prototyping and measuring continues until an acceptable sigma value results. Once the process sigma is acceptable, mechanisms are adopted to control the quality of the process during production during control phase 34.

While current design procedures wait until actual prototypes are produced to determine a sigma, sigmas can be generated throughout all design procedure phases. For example, during specify phase 26 a target sigma can be specified. Similarly during each of the allocate and predict phases separate sigmas can be determined.

Unfortunately such pre-prototype sigmas are not very useful in and of themselves. This is because, for two reasons, a designer has very little confidence during the early phases of a design procedure that a sigma estimate is correct. First, where a final product includes many different CTQs, the task of generating a meaningful sigma is extremely complex as different CTQs may be at different development phases. In the pen example, the cap may be near the measurement phase while the barrel is at the allocate phase. Thus, the problem is how to combine product characteristics to generate a meaningful sigma value when different characteristics are at different phases of the development process.

Second, during early development phases the developer has very little information on which to base a sigma. To this end, referring to FIG. 3, a graph illustrates a prediction interval which reflects a sigma confidence factor (i.e., a factor indicating likelihood that a sigma estimate is accurate) during the phases of a design procedure. Initially, during the identify phase, only product CTQs are known (i.e. the USLs and LSLs have not been defined). Therefore, the prediction interval during the identify phase is between 0 and infinity indicating that whatever sigma is chosen as a design criteria during the identify phase, the designer will have virtually no confidence that the chosen sigma can be achieved.

Figure 3:
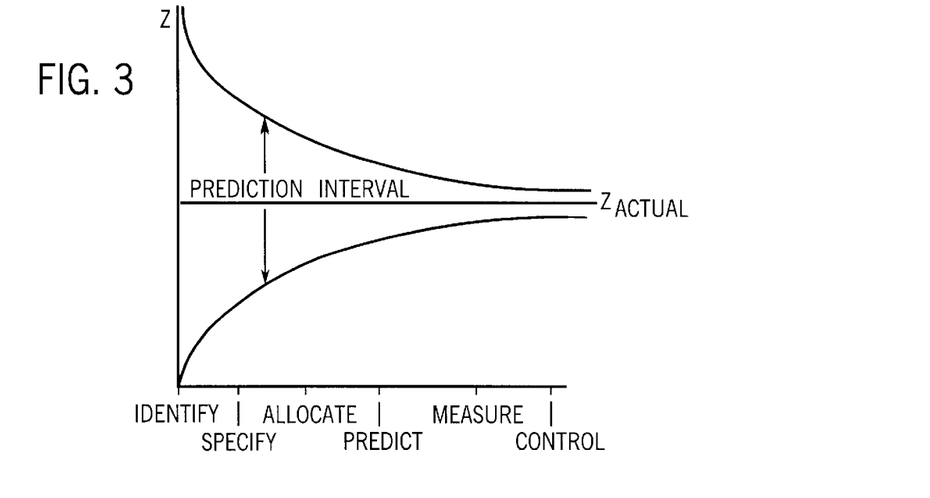
FIG. 3 is a graph illustrating a prediction interval corresponding to a Z or sigma during different development procedure phases.

During the specify phase additional information corresponding to the final product is specified. Specifically, the USLs and LSLs for each CTQ are specified. Therefore, if a sigma value is specified during this phase, the prediction interval is much narrower than during the identify phase. For example, if a desired stock length L2 is 3.0 inches and the USL and LSL for the stock length CTQ are 2.95 and 3.05, respectively, the level of confidence that a chosen sigma can be achieved is better than prior to selection of the USL and LSL.

During the allocate phase additional information including mean and standard deviation criteria are chosen. The mean, standard deviation, USL and LSL can be used to calculate a sigma. Again, the sigma confidence factor will be higher, as reflected in the narrower prediction interval in FIG. 3, during the allocate phase than during the previous phases, because more information is known about the final product during the allocate phase. Similarly, during the predict phase additional information is known and therefore the prediction interval is narrower and the confidence factor is higher.

Thus, while pre-prototype sigmas may be determined, the dubious nature of pre-prototype sigmas was thought to render pre-prototype sigmas essentially useless and, for this reason, prior to the present invention, pre-prototype sigmas were not determined.

Similarly, while means and standard deviations were determined during pre-prototype development phases, because those statistics were based on relatively little information, those statistics were not routinely tracked to identify trends and the like.

However, the inventors of the present invention have recognized several insights which render quality factors such as pre-prototype means and standard deviations and sigmas extremely useful. First, the development phase at which a quality factor is determined can be used as a rough confidence factor for a corresponding quality factor. In this regard a confidence factor is a relative value which is indicative of the probability that a corresponding quality factor is accurate.

To this end, referring again to FIG. 3, the development phase for a product is associated with the level of confidence that a sigma is accurate and therefore is, by definition, a confidence factor. For example, a designer should have less confidence is a 4.5 sigma at the allocate phase than he would in a 4.5 sigma at the predict phase and thus, a sigma/phase or sigma/confidence factor pairing is useful. Similar comments can be made with respect to means and standard deviations.

Second, by observing quality factor changes during the development process, a designer can identify design modifications during pre-prototype phases which can be made to increase a final sigma (e.g., a final quality factor). In this regard, assume that at the allocate phase a sigma is 4.5 but at the predict phase the sigma has dropped to 3.5, well below a desired sigma. In this case, the designer can analyze and improve the design prior to prototyping and measurement (see FIG. 2) to increase the likelihood of achieving the desired sigma.

Third, separate CTQ specific quality factors and confidence factors can be generated during development and can then be combined to provide an estimated quality factor and corresponding confidence factor which can be used to assess, at an early development stage and prior to prototyping, the probability that a desired quality factor will be achievable with a current design. If the probability of achieving the desired quality factor is low, design changes can be made.

Fourth, the CTQ quality factors and confidence factors can be combined into at least two different tools which are useful for more specifically determining where resources should be spent and where design modifications should be considered during subsequent development phases. With respect to sigmas, a first tool is a matrix including CTQs and sigma/confidence factor pairs for each CTQ. By observing the sigmas and confidence factors a designer can identify specific CTQs which are lagging in the development procedure and which are ahead of schedule, can determine which CTQs are easily within allocated means and standard deviations and which are not and generally can shift resources and perhaps modify USLs and LSLs or means and standard deviations to achieve overall design goals.

The second tool is a bar chart which provides a snap shot of development progress. An exemplary chart includes sigma bars indicating the number of CTQs within specific sigma ranges and the breakdown of CTQs with respect to confidence factors (i.e., development phases). In use, a designer can quickly see sigma trends throughout development progression to proactively determine if design modifications are required.

Tools

Figure 4:
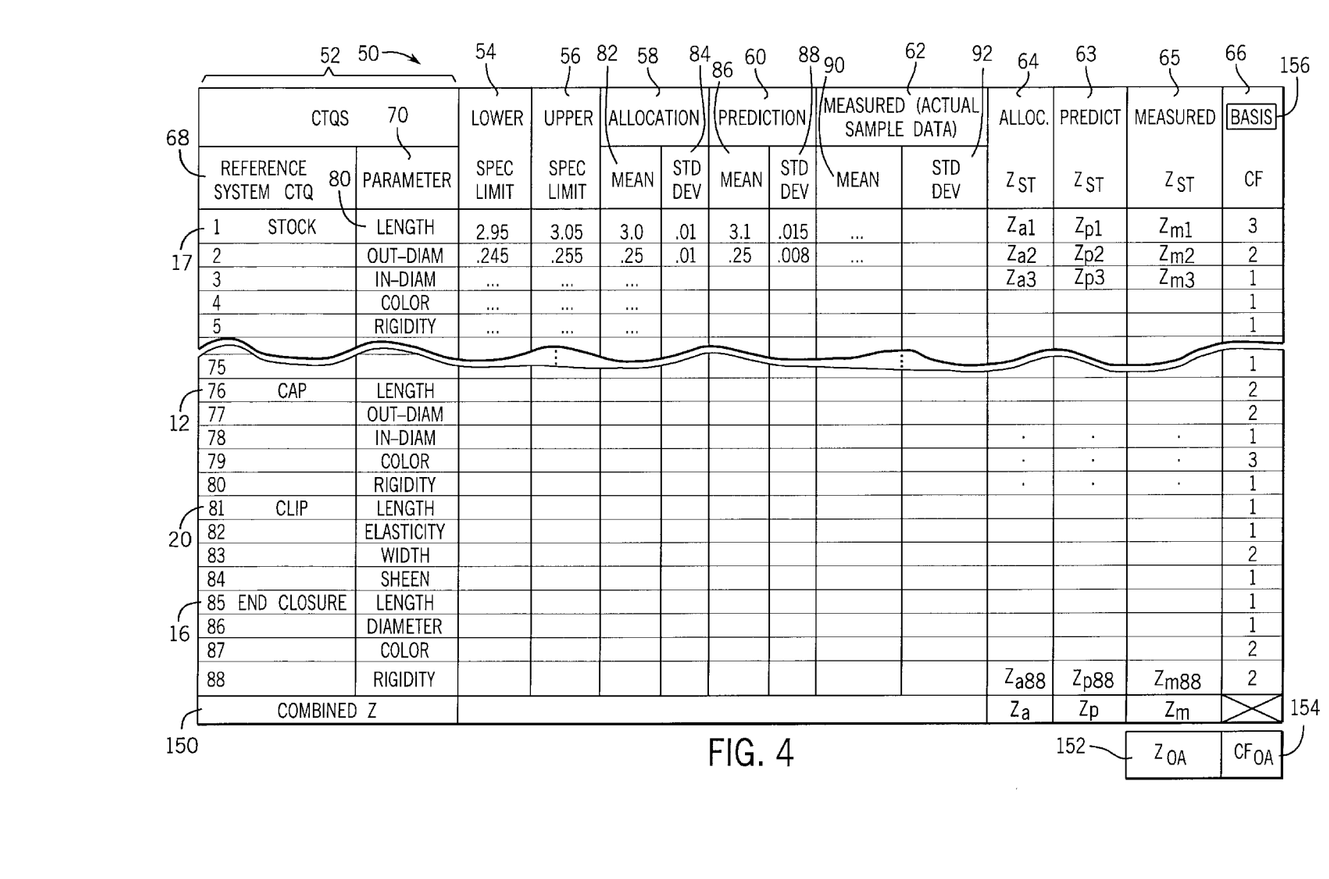
FIG. 4 is a schematic diagram of an exemplary matrix according to at least one embodiment of the present invention.

Referring now to FIG. 4, an exemplary CTQ matrix 50 corresponding to the pen described above is illustrated. Matrix 50 includes a CTQ column 52, a LSL column 54, a USL column 56, an allocation column 58, a prediction column 60, a measured column 62, allocate, predict and measured $Z_{st}$ (i.e., sigma) columns 64, 63, 65, respectively, and a basis column 66. Column 52 includes two sub-columns including a reference system CTQ column 68 and a parameter column 70. Column 68 includes a list of sub-products or components which constitute the pen and includes, among other things, a stock 17, a cap 12, a clip 20 and an end closure member 16 (see also FIG. 1).

Column 70 includes a set of CTQs corresponding to each component in column 68. For example, with respect to stock 17, column 70 includes length 80, outer diameter, inner diameter, color, rigidity, etc., CTQs. Although not illustrated, similar CTQs are provided for each of subproducts cap 12, clip 20 and end closure 16. In the present example, although only a small number of CTQs are illustrated, it will be assumed that a total of 88 CTQs have been identified for the pen.

Columns 54 and 56 include a lower specified limit (LSL) and an upper specified limit (USL), respectively, corresponding to each of the parameters in column 70. For example, with respect stock length 80, the LSL is 2.95 inches while the USL is 3.05 inches. These LSL and USIL are specified by the pen designer and may be a function of other CTQs. For example, referring again to FIG. 1, with respect to the overall pen length L1, barrel 14 includes both a sock 17 and a tip 15. Tip 15 is to be sized and dimensioned so that it fits within cap 12 as illustrated. It will be assumed that a target overall pen length L1 is 5.5 inches when tip 15 is received within cap 12 and end closure member 16 is secured within barrel stock 17. Also, it will be assumed that the ideal tip length L3 is 2.0 inches, the ideal barrel stock length L2 is 3.0 inches, the ideal cap length L4 is 2.25 inches and the ideal end closure member length L5 is 0.25 inches. Moreover, it will be assumed that the overall pen length L1 can vary from the ideal 5.5 inch length by ±0.1 inches. Because the overall pen length L1 is a combination of end closure length L5, stock length L2 and cap length L4, the tolerance ±0.1 inches must be distributed among the three components (i.e., closure member 16, stock 17 and cap 12). For example, of the ±0.1 tolerance, 0.05 inches may be assigned to stock length L2 and 0.025 inches may afforded each of end closure member 16 and cap 12. The LSLs and USLs are all provided during the specify phase (see 26 in FIG. 2) of the development procedure.

Referring again to FIG. 4, allocation column 58 is used to tally statistical pairs (i.e. means and standard deviations) and therefore includes both a mean column 82 and a standard deviation column 84. Column 82 is to be filled in with a mean for each of the CTQs in column 70. Similarly, column 84 is to be filled in with a standard deviation for each of the CTQs in column 70. The mean and standard deviation columns 82, 84, respectively, are filled in during allocate phase 28 (see FIG. 2) of the development procedure. To this end, the mean and standard deviation which are filled in to each of the boxes in columns 82 and 84 are targets which should be achieved through the design process.

Column 60 like column 58, includes both a mean column 86 and a standard deviation column 88 for tracking statistical pairs. As in the case of column 58, each of the mean and standard deviation columns 86, 88, respectively, are to be filled in with corresponding characteristics associated with CTQs in column 70. However, unlike the mean and standard deviation values provided in column 58, the mean and standard deviation values provided in column 86 and 88 are calculated using a number of different tools at the designers disposal including, among others, expert opinion, modeling equations, computer simulations and other empirical or simulation tools. Because of the additional information used to identify the mean and standard deviation at the prediction stage, the mean and standard deviation values at the prediction phase should be more accurate than at the allocation phase.

Referring still to FIG. 4, measured column 62, like columns 58 and 60 includes two columns, a mean column 90 and a standard deviation 92. Each of columns 90 and 92 are to be filled in with corresponding characteristics for CTQs in column 70. Unlike the values in columns 60 and 58, however, the values in column 62 are calculated using actual sample data from prototypes of the product being designed.

Once again, because additional information is used to identify the means and standard deviations at the measure phase when compared to previous phases, the mean and standard deviation values at the measure phase are more accurate than similar values at the previous phases.

Thus, referring still to FIG. 4, and specifically to length CTQ 80 and corresponding data in columns 58, 60 and 62, it should be appreciated that each statistical pair which includes a mean and a corresponding standard deviation constitute a quality factor which is indicative of the probability that final products will be within the upper and lower limits USL and LSL, respectively. In addition, as indicated above, the phases (i.e., allocate, predict and measure) corresponding to each statistical pair (i.e., mean and standard deviation) correspond to confidence factors indicative of the probability that the quality factors associated therewith are accurate. For example, statistical pairs in the allocate phase and column 58 are probably less accurate than statistical pairs in the same row and in the predict phase and column 86. Similarly, statistical pairs in the measured phase and column 62 will be more accurate than pairs in the previous phases.

During progression through the development procedure some CTQs will be developed more rapidly than others and therefore corresponding rows of statistical pairs (i.e. quality factors) among CTQs will be filled in through different phases. Examining matrix 50 a designer or a suitably equipped computer can quickly determine necessary or advantageous shifts in development resources among CTQs so that a quality product results with a high sigma.

For instance, in the example above, assume that development of cap 12 length and stock 17 length have each progressed to the predict phase but that development end closure member 16 length is still at the allocate phase. Also, assume that predictions are that cap 12 will easily meet the mean and standard deviation targets set for the cap but that stock 17 will not achieve the mean and standard deviations targeted. In this case, knowing that the cap length L4, closure length L5 and stock length L2 together comprise the overall pen length L1 (see FIG. 1), first, resources should be shifted to end closure length development so that a mean and a standard deviation for the closure can be predicted. Second, after closure length mean and standard deviation have been predicted, any of several options can be chosen.

One option is that the tolerance may be redistributed among the cap, stock and end closure lengths providing less stringent limits for the stock and more rigid tolerances for the cap. Another option is that the process for generating stock 17 be modified to yield a better predicted mean and standard deviation. Still another option is to, if the stock mean and standard deviations are close to the target values, proceed to prototype and then measure hoping that the cap mean and standard deviation offset disparate stock statistics.

In addition to enabling easy identification of CTQs requiring additional resources at specific development times, matrix 50 can also be used to identify quality factor trends thereby providing some guidance on how the design process generally can be improved. For instance, referring again to FIG. 4, and the data in the row corresponding to length 80, if the mean and standard deviations get progressively worse as development moves through allocate, predict and measured phases, clearly the assumptions and modeling at the predict phase are not accurate and should be revisited to develop more accurate prediction tools.

Thus matrix 50 provides a CTQ list wherein CTQs are correlated with quality factors (i.e. statistical pairs) and confidence factors (i.e. allocate, predict and measure phases) such that value is added to quality factors which are developed during pre-prototype development phases.

Referring still to FIG. 4, columns 64, 63 and 65 include Zs corresponding to statistical pairs in columns 58, 60 and 62, respectively. To this end Zs corresponding to an allocate phase include a subscript "a", Zs corresponding to a predict phase include a subscript "p" and Zs corresponding to a measured phase include a subscript "m". Zs within the same phase are distinguished by a subscript number (e.g. $Z_{a1}$, $Z_{a2}$, etc.). In the present example, each Z is automatically determine when a corresponding mean and standard deviation are provided in matrix 50. To this end, any of several well known sigma equations can be used to mathematically combine a corresponding mean and standard deviation along with associated LSL and USL values from columns 54 and 56 to generate a Z or sigma value.

In this regard, each Z is a second quality factor and, by being listed in a phase column, is associated with a specific confidence factor (e.g. allocate, predict or measure). The Zs in columns 64, 63 and 65 can be used for the same purposes as the statistical pairs in columns 58, 60 and 62. Specifically, the Zs can be used by a computer to identify advantageous resource shifts and to locate development problem area so that subsequent development procedures can be modified.

Referring still to FIG. 4, a final row 150 of matrix 50 is a "combined Z" row wherein, as Zs are added to the phase columns thereabove, a combined phase Z for each phase (e.g. allocate, predict and measure) is updated to be the average of all Zs at the phase of development. For example, an allocate phase Z referred to as $Z_a$ is the average of all $Z_{an}$'s thereabove where n is an integer between 1 and 88 (i.e. there will eventually be 88 allocate Zs). Combined predict and measure Zs are referred to as $Z_p$ and $Z_m$, respectively.

Just as Zs corresponding to a single CTQ can be used to track development trends and gain insight into how the development process can be improved, the combined phase Zs (i.e. $Z_a$, $Z_p$ and $Z_m$) can be used in the same manner. For example, if combined Z values deteriorate during the development procedure modeling must be modified to better reflect reality.

Referring still to FIG. 4, a final comparison of matrix 50 includes an overall Z referred to as $Z_{OA}$ and an overall confidence factor $CF_{OA}$ which appear in boxes 152 and 154 at the bottom of matrix 50. Overall $Z_{OA}$ can be determined by any of several different formulas using any combination of Zs wherein the combination includes one Z corresponding to each CTQ unless a CTQ does not yet have a Z in which case the combination does not include a Z for the particular CTQ. To this end, the numbers in basis column 66 correspond to Z columns 64, 63 and 65. A "1" corresponds to a Z in column 64, a "2" corresponds to a Z in column 63 and a "3" corresponds to a Z in column 65.

It is contemplated that, where matrix 50 is provided by a computer, a "Basis" icon 156 can be toggled to change any of the numbers in column 66. To this end, if a box in column 66 is selected (e.g., via a mouse controlled cursor, not illustrated) and then icon 156 is selected, the number in the selected box scrolls through numbers 1, 2 and 3 until a desired Z is selected.

Although not preferred, an exemplary formula may simply mathematically combine the Zs selected via basis column 66 to generate the overall $Z_{OA}$. Other more complex (e.g. weighted) formulas are contemplated.

Overall confidence factor $CF_{OA}$ is determined by applying a formula to the confidence factors in column 66. One simple formula may average the numbers in column 66. Other formulas including formulas which are weighted and formulas which account for additional factors are contemplated. Overall $Z_{OA}$ and overall confidence factor $CF_{OA}$ can be used as a barometer for development progress.

Referring still to FIG. 4, it should be appreciated that, while there is other information provided in matrix 50, most importantly, each of the CTQs is listed (column 70) which corresponds to the pen, and, at least one quality factor and confidence factor pair is provided for each of the CTQs. Thus, it should be appreciated that at any time during the development process, a designer can refer to matrix 50 to identify three things. First, the designer can identify a quality factor corresponding to each CTQ for the pen begin designed. Second, the designer can identify the level of confidence which is due the quality factor for each CTQ. Third, by analyzing quality factor trends, the designer can identify specific CTQs and specific development phases at which resources should be spent or where changes in design should be made in order to ensure that prototypes will meet desired quality goals.

Figure 5:
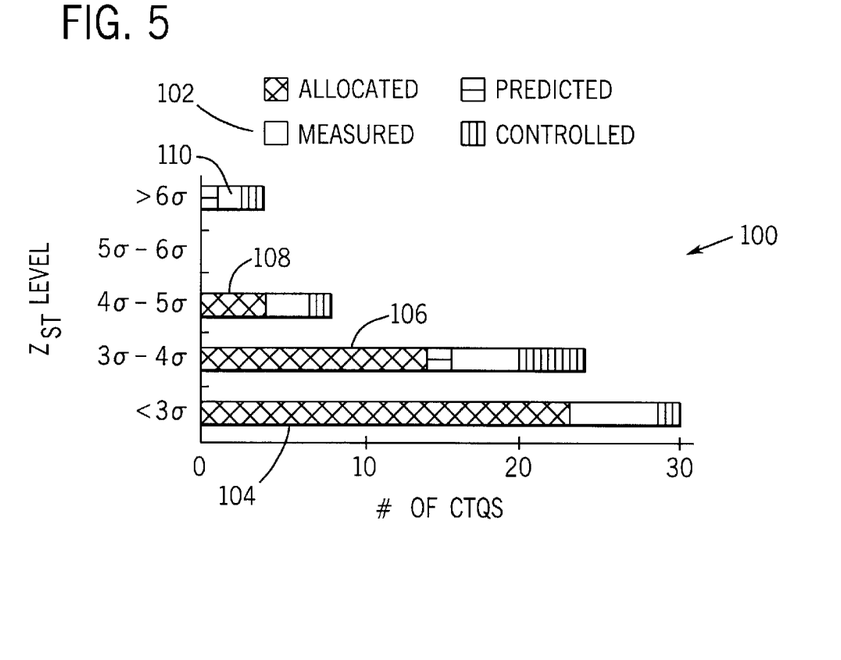
FIG. 5 is an exemplary chart according to the present invention.

Referring now to FIG. 5, an exemplary bar chart tool which includes Z, CTQ and development phase information is illustrated. The exemplary chart 100 includes a vertical axis corresponding to Z ranges and a horizontal axis corresponding to a number of CTQs within each one of the ranges. The Z ranges are less than 3 Z, between 3 and 4 Z, between 4 and 5 Z, between 5 and 6 Z and greater than 6 Z. In the present example, it is assumed that there are 88 CTQs and therefore, while the horizontal axis only goes up to 30 CTQs in FIG. 5, it should be appreciated that the horizontal axis can be extended to accommodate additional CTQs up to 88.

A key 102 is provided above chart 100 and indicates that CTQs in the allocated phase in chart 100 are represented by a black bar, CTQs in the predicted phase are identified by a bar with a horizontal line therethrough, CTQs in the measured phase are identified by a blank bar and CTQs in the control phase of development are identified by a bar with vertical lines therethrough.

While there are five Z ranges along the horizontal axis of chart 100, in the present example, there are no CTQs having a Z value within the range between 5 and 6 Z and therefore, there are only four bard provided on chart 100. The bars include bar 104 within the Z range below 3 z, bar 106 within the range between 3 and 4 z, bar 108 between the range of 4 and 5 Z and bar 110 corresponding to CTQs having a Z value greater than 6.

By observing chart 100 a designer can quickly identify the status of a development procedure. For example, if a large number of CTQs in the allocated development phase have high Z values (e.g., greater than 5 z) and the CTQs at the measured and controlled stages have relatively low Z values, it is likely the design procedure is not proceeding as planned and that, if development proceeds in the same manner, the resulting Z value of the final product will be lower than specified. On the other hand, as illustrated in FIG. 5, if the CTQs in the allocated phase of development are generally lower or equal to the CTQs in the measured and controlled phases, development will probably result in an acceptable Z value.

Figure 6:
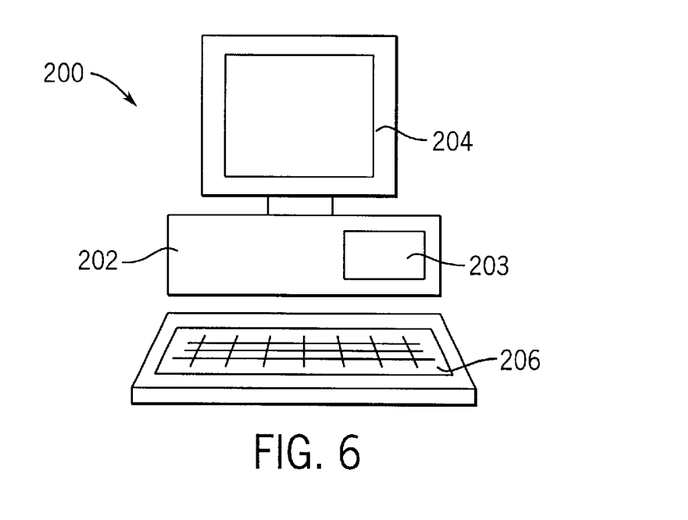
FIG. 6 is a schematic diagram illustrating a computer.

Referring now to FIG. 6, a simple computer system 200 for implementing the inventive method is illustrated and includes a computer having a storage medium 203, a display 204 and an interface keyboard 206. A program code for controlling computer 202 is stored on medium 203. The code causes computer 202 to provide data entry tools or screens on display 204 to guide a system user through the process of generating a matrix 50 (see also FIG. 4 and/or FIG. 5). To this end, the screens may include screens for separately requesting CTQs, USLs, LSLs, means and standard deviations. In the alternative, a single screen similar to FIG. 4 may be provided with some simple instructions requesting data entry into matrix boxes.

Figure 7:
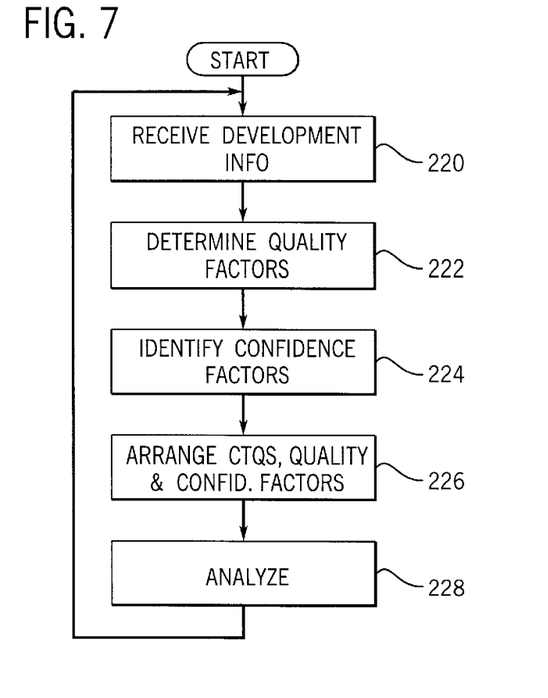
FIG. 7 is a flow chart illustrating an exemplary method according to the present invention

Referring also to FIG. 7, an exemplary method is illustrated. At block 220 development information is received by computer 202 which may include CTQs, USLs and LSLs as well as allocate means and standard deviations. At block 222 a quality factor (e.g., a statistical pair or a sigma or both) are determined for each CTQ. At block 224 confidence factors for each quality factor are identified and then at block 226 the CTQs, quality and confidence factors are arranged as either a matrix 50 or as a chart 150 for display and analysis.

An optional step is represented by block 228 where, if the program code in medium 203 is equipped with analysis tools, computer 202 can analyze the quality and confidence factors and suggest resource shifts.

It should be understood that the methods and apparatuses described above are only exemplary and do not limit the scope of the invention, and that various modifications could be made by those skilled in the art that would fall under the scope of the invention. For example, while the invention is described in the context of product development, the invention is also applicable to service and process development procedures.

To apprise the public of the scope of this invention, the following claims are made:

What is claimed is:

1. A method to be used during a product development procedure wherein the procedure includes a series of consecutive development phases and the product includes at least two critical to quality characteristics (CTQs), the method for generating a confidence matrix which can be used to increase a product sigma through product design, a user initially providing product limits and thereafter providing additional development information during each consecutive development phase, the method comprising the steps of, during at least two of the development phases and for each CTQ:

a. using the development information to determine a quality factor which is indicative of the probability that the product will be within the specified limits;
   b. identifying a confidence factor which is indicative of the probability that the quality factor is accurate;
   c. arranging the quality factors, CTQs and confidence factors such that the CTQs and factors are correlated thereby forming the confidence matrix; and
   d. using the confidence matrix to increase product sigma during the design process.

2. The method of claim 1 wherein the confidence factors are a function of the phases of development of the corresponding CTQs when the quality factors are determined.

3. The method of claim 1 wherein the confidence factors are the phases of development of the corresponding CTQs when the quality factors are determined.

4. The method of claim 3 wherein each quality factor includes a statistical pair and each statistical pair includes a mean and a standard deviation.

5. The method of claim 4 wherein phases for which statistical pairs are determined are matrix phases, the step of arranging includes designating a matrix column as a CTQ column, designating a matrix column for each matrix phase and populating matrix rows with corresponding CTQs, means and standard deviations.

6. The method of claim 5 wherein the phases include an identify phase wherein CTQ characteristics are determined to be material, a control phase wherein CTQ characteristics can be evaluated using actual production data and interim phases between the identify and control phases.

7. The method of claim 6 wherein the interim phases include an allocate phase wherein target distributions for each CTQ are established, a predict phase wherein knowledge of the CTQ is modeled to predict distribution response and a measure phase wherein the CTQ can be evaluated by using actual experimental data.

8. The method of claim 7 wherein the quality and confidence factors are determined and identified, respectively, for each of the allocate, predict and measure phases during the respective phases and wherein the arrangement is updated periodically to reflect development procedure progress.

9. The method of claim 4 wherein the quality factor is a first quality factor and the method includes the step of determining a second quality factor for each CTQ and wherein the second quality factor is a sigma and, wherein, the step of arranging further includes arranging such that the second quality factors are also correlated with corresponding CTQs.

10. The method of claim 9 wherein the step of determining the second quality factor for each CTQ includes mathematically combining a mean and a standard deviation corresponding to the CTQ.

11. The method of claim 9 wherein the confidence factor is a first confidence factor and the method further includes the steps of, for each CTQ sigma, identifying a second confidence factor which is indicative of the probability that the sigma is accurate and arranging the second confidence factors such that the second confidence factors are correlated with corresponding sigmas.

12. The method of claim 11 wherein the second confidence factors are the phases of development of the corresponding CTQs when the sigmas are determined.

13. The method of claim 12 further including the step of, for each phase, mathematically combining all of the sigmas corresponding to the phase to generate a phase sigma.

14. The method of claim 3 wherein each quality factor includes a CTQ sigma.

15. The method of claim 1 further including the step of mathematically combining one quality factor and one confidence factor corresponding to each CTQ to generate an overall quality factor and an overall confidence factor.

16. The method of claim 15 further including the steps of analyzing the CTQ quality factors and CTQ confidence factors and adjusting the balance of development efforts between the CTQ characteristics to increase at least one of the overall quality factor and overall confidence factor.

17. The method of claim 1 wherein the step of using includes the step of analyzing the confidence matrix to identify confidence factor trends, modifying at least a subset of the development information as a function of the trends and repeating steps (a) through (c) to update the confidence matrix.

18. An apparatus to be used during a product development procedure wherein the procedure includes a series of consecutive development phases and the product includes at least two critical to quality characteristics (CTQs), the apparatus for generating a confidence matrix which can be used to increase a product sigma through product design, a user initially providing product limits and thereafter providing additional development information during each consecutive development phase to the apparatus, the apparatus comprising a computer performing a method comprising the steps of, during at least two of the development phases and for each CTQ:
      a. using the development information to determine a quality factor which is indicative of the probability that the product will be within the specified limits;
      b. identifying a confidence factor which is indicative of the probability that the quality factor is accurate; and
      c. arranging the quality factors, CTQs and confidence factors such that the CTQs and factors are correlated thereby forming the confidence matrix that can be used to analyze confidence factor trends during the design process.

19. The apparatus of claim 18 wherein the confidence factors are a function of the phases of development of the corresponding CTQs when the quality factors are determined.

20. The apparatus of claim 18 wherein the confidence factors are the phases of development of the corresponding CTQs when the quality factors are determined.

21. The apparatus of claim 20 wherein each quality factor includes a statistical pair and each statistical pair includes a mean and a standard deviation.

22. The apparatus of claim 21 wherein phases for which statistical pairs are determined are matrix phases, the step of arranging includes designating a matrix column as a CTQ column, designating a matrix column for each matrix phase and populating matrix rows with corresponding CTQs, means and standard deviations.

23. The apparatus of claim 22 wherein the phases include an identify phase wherein CTQ characteristics are determined to be material, a control phase wherein CTQ characteristics can be evaluated using actual production data and interim phases between the identify and control phases.

24. The apparatus of claim 23 wherein the interim phases include an allocate phase wherein target distributions for each CTQ are established, a predict phase wherein knowledge of the CTQ is modeled to predict distribution response and a measure phase wherein the CTQ can be evaluated by using actual, experimental data.

25. The apparatus of claim 24 wherein the quality and confidence factors are determined and identified, respectively, for each of the allocate, predict and measure phases during the respective phases and wherein the arrangement is updated periodically to reflect development procedure progress.

26. The apparatus of claim 21 wherein the quality factor is a first quality factor and the method performed by the computer includes determining a second quality factor for each CTQ and wherein the second quality factor is a sigma and, wherein, the step of arranging further includes arranging such that the second quality factors are also correlated with corresponding CTQs.

27. The apparatus of claim 26 wherein the step of determining the second quality factor for each CTQ includes mathematically combining a mean and a standard deviation corresponding to the CTQ.

28. The apparatus of claim 26 wherein the confidence factor is a first confidence factor and the method performed by the computer includes, for each CTQ sigma, identifying a second confidence factor which is indicative of the probability that the sigma is accurate and arranging the second confidence factors such that the second confidence factors are correlated with corresponding sigmas.

29. The apparatus claim 28 wherein the second confidence factors are the phases of development of the corresponding CTQs when the sigmas are determined.

30. The apparatus of claim 29 wherein the computer further performs the step of, for each phase, mathematically combining all of the sigmas corresponding to the phase to generate a phase sigma.

31. The apparatus of claim 20 wherein each quality factor includes a CTQ sigma.

32. The apparatus of claim 18 wherein the computer further performs the step of, mathematically combining one quality factor and one confidence factor corresponding to each CTQ to generate an overall quality factor and an overall confidence factor.

33. The apparatus of claim 32 wherein the computer further performs the steps of, analyzing the CTQ quality factors and CTQ confidence factors and adjusting the balance of development efforts between the CTQ characteristics to increase at least one of the overall quality factor and overall confidence factor.

* * * * *